United States Patent Office 3,784,554
Patented Jan. 8, 1974

---

3,784,554
PESTICIDAL PHOSPHORYLATED THIAZOLE DERIVATIVES
Michael D. Barker, Maidstone, England, assignor to Shell Oil Company, New York, N.Y.
No Drawing. Filed Feb. 24, 1972, Ser. No. 229,152
Claims priority, application Great Britain, Mar. 12, 1971, 6,684/71
Int. Cl. C07d 91/32
U.S. Cl. 260—302 E    3 Claims

ABSTRACT OF THE DISCLOSURE

Novel pesticidal phosphorylated thiazole derivatives.

FIELD OF THE INVENTION

This invention relates to the use as pesticides of novel thiazole derivatives phosphorylated at the 5-position of the ring.

DESCRIPTION OF THE PRIOR ART

A search has disclosed no phosphorylated thiazoles of this invention or use of any such as pesticides.

PREFERRED EMBODIMENTS OF THE INVENTION

The present invention provides thiazole derivatives of general formula:

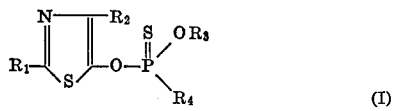

wherein $R_1$ is alkyl, alkoxy or phenyl; $R_2$ is alkyl, alkylthio, alkylthioalkyl or phenyl; $R_3$ is alkyl; $R_4$ is alkyl, alkoxy or dialkylamino.

Preferred thiazole derivatives are those of Formula I wherein $R_1$ represents an alkyl or alkoxy group of 1–6 carbon atoms, for example methyl, isopropyl or isoproxy, or a phenyl group; $R_2$ represents an alkyl, alkylthio or alkylthioalkyl group of up to 6 carbon atoms, for example methyl, isopropyl, s-butyl, methylthio or methylthioethyl, or a phenyl group; $R_3$ represents an alkyl group of 1–6 carbon atoms, for example methyl or ethyl; and $R_4$ represents an alkyl, alkoxy or dialkylamino group of up to 6 carbon atoms, for example ethyl, methoxy, ethoxy or dimethylamino.

The thiazole derivatives are prepared by a process which comprises reacting a thiazolone of formula:

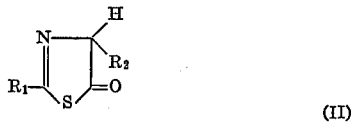

with a base and a phosphorus halide of formula:

wherein Hal represents a halogen, suitably chlorine, atom. The base is preferably a strong inorganic base, for example an alkali metal hydride such as sodium hydride. The reaction is suitably carried out in an organic medium such as tetrahydrofuran or a benzene/dimethylformamide mixture.

The manner in which compounds of the invention are prepared by this process is illustrated in the working examples hereinafter.

The organophosphorus reactants used are, of course, well known in the art. The thiazole derivatives used can be prepared by any of the methods known in the art. A convenient method comprises reacting a N-thioacyl amino acid derivatives of the formula

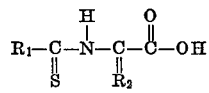

with phosphorus tribromide and liberating the thiazolone by treating the resulting hydrobromide salt with a suitable base, such as sodium bicarbonate. This process is illustrated in the following examples, the identity of the product, in each case, being confirmed by elemental analysis.

EXAMPLE I

Preparation of 4-isopropyl-2-methylthio thiazol-5-one

Valine (11.7 grams) was dissolved in water (30 milliliters) containing potassium hydroxide (11.2 grams) and the solution was cooled to 10° C. Carbon disulphide (7.6 grams) was added to the solution and the mixture was stirred for 5 hours. Methyl iodide (14.7 grams) was added to the orange solution which was then cooled and stirred for a further one hour. The solution was acidified with concentrated hydrochloric acid (10 milliliters) and extracted with ether. The dried extracts were evaporated to give a yellow syrup which solidified on standing. The solid was recrystallized from a benzene/petroleum ether mixture. The pure intermediate (5.0 grams) was dissolved in benzene (50 milliliters) containing acetic anhydride (2.5 grams) and the solution was allowed to stand for 48 hours at 70° C. The solution was then washed with aqueous saturated sodium bicarbonate solution, dried and evaporated to leave the thiazolone as a yellow oil.

EXAMPLE II

Preparation of 2-methyl-4-sec-butyl thiazol-5-one

N-thioacetylisoleucine (12.2 grams) was dissolved in tetrahydrofuran (50 milliliters) and to this solution was added dropwise a solution of phosphorous tribromide (18.5 grams) in tetrahydrofuran (25 milliliters). The white precipitate formed was filtered off, washed, dried and suspended in dichloromethane (50 milliliters). Aqueous sodium bicarbonate solution was added to the suspension until its pH reached 8. The organic layer was separated, dried over anhydrous magnesium sulfate and the solvent removed under reduced pressure to leave the thiazolone as a pale yellow oil.

EXAMPLE III

Preparation of 2-isopropoxy-4-isopropylthiazol-5-one

Isopropyl-(1 - carboxyisobutyl)thionocarbamate (15.5 grams) in dry tetrahydrofuran (70 milliliters) was mixed with dicyclohexylcarbodiimide (15.5 grams) in tetrahydrofuran (70 milliliters) and the mixture was allowed to stand for two hours at room temperature. The mixture was then filtered and the filtrate evaporated under reduced pressure. The residue was taken up in ether and the solution filtered and evaporated to leave a brown oil which was purified by distillation to give the thiazolone as a colorless oil boiling point 60° C. at 0.7 torr.

Other thiazolone precursors were prepared and identified in a similar manner.

As mentioned above the thiazole derivatives of the invention are of interest as pesticides, and in particular as broad spectrum insecticides and acaricides having relatively low toxicity to mammals. The invention includes therefore pesticidal compositions comprising a carrier or a surface-active agent, or both a carrier and a surface-active agent, and, as active ingredient, at least one thiazole derivative of the invention. Likewise the invention includes also a method of combatting insect or acarid pests at a locus which comprises applying to the locus a pesticidally effective amount of a thiazole derivative or composition of the invention.

The term "carrier" as used herein means a solid or fluid material, which may be inorganic or organic and of synthetic or natural origin, with which the active compound is mixed or formulated to facilitate its application to the plant, seed, soil or other object to be treated, or its storage, transport or handling.

The surface-active agent may be an emulsifying agent, a dispersing agent or a wetting agent, and may be ionic or non-ionic.

Any of the carrier materials or surface-active agents usually applied in formulating pesticides may be used and suitable examples of these are to be found, for example, in British Pat. No. 1,232,930.

The compositions of the invention may be formulated as wettable powders, dusts, granules, solutions, emulsifiable concentrates, emulsions suspension concentrates and aerosols. Wettable powders are usually compounded to contain 25, 50 or 75% w. of toxicant and usually contain, in addition to solid carrier, 3–10% w. of a dispersing agent, and, where necessary, 0–10% w. of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w. of toxicant. Granules are usually prepared to have a size between 10 and 100 BS mesh (1.676–0.152 mm.), and may be manufactured by agglomeration or impregnation techniques. Generally, granules will contain ½–25% w. toxicant and 0–10% w. of additives such as stabilizers, slow release modifiers and binding agents. Emulsifiable concentrates usually contain, in addition to the solvent and, when necessary, co-solvent, 10–50% w./v. toxicant, 2–20% w./v. emulsifiers and 0–20% w./v. of appropriate additives such as stabilizers, penetrants and corrosion inhibitors. Suspension concentrates are compounded so as to obtain a stable, non-sedimenting, flowable product and usually contain 10–75% w. toxicant, 0.5–15% w. of dispersing agents, 0.1–10% w. of suspending agents such as protective colloids and thixotropic agents, 0–10% w. of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

The compositions of the invention may also contain other ingredients, for example, other compounds possessing pesticidal in particular insecticidal, acaricidal, herbicidal, or fungicidal properties.

Aqueous dispersion and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The invention is further illustrated in the following examples, in which the identity of each of the compounds was confirmed by elemental analysis and nuclear magnetic resonance spectrum.

EXAMPLE IV

Dimethyl-(4-isopropyl-2-phenylthiazol-5-yl) phosphorothionate 4-isopropyl-2-phenylthiazol-5-one (3.3 grams) was dissolved in a 10% mixture of dimethyl formamide in dry benzene (100 milliliters) and sodium hydride (0.36 gram) was added portionwise to the solution. Dimethyl phosphorochloridothionate (2.4 grams) was then added and the mixture was stirred for two hours at room temperature. The mixture was then poured into water and the benzene layer separated. The aqueous layer was extracted with ether and the extracts combined with the benzene solution. The organic solution was dried and evaporated under reduced pressure. The residue was chromatographed on silica gel using 5% acetone in petroleum ether as eluant to give the desired product as an oil.

EXAMPLE V (4-isopropyl-2-methyl-1,3-thiazol-5-yl)-methyl-N,N-dimethyl phosphoroamidothionate 4 - isopropyl-2-methylthiazolin-5-one (3.3 grams) was dissolved in dry tetrahydrofuran (50 milliliters) and the solution was cooled in an ice bath. Sodium hydride (0.48 gram) was added to the solution, followed by methyl, N, N-dimethylphosphoroamidochloridothionate (3.4 grams) with stirring. The stirring was continued for 2 hours after which the solvent was removed under reduced pressure. The residue was dissolved in ether and the solution was washed with water and dried with magnesium sulfate. The ether was removed under reduced pressure and the pale yellow oil obtained was purified by chromatography on silica gel using a 10.1 hexane/acetone mixture as eluant to give the desired product as an oil.

EXAMPLE VI

Following procedures similar to that given in these examples, the following further species were prepared:

dimethyl-(4-isopropyl-2-methylthiazol-5-yl)phosphorothionate
dimethyl-(4-(2-methylthioethyl)-2-phenylthiazol-5-yl) phosphorothionate
dimethyl-(2,4-diphenylthiazol-5-yl)phosphorothionate
dimethyl-(2-methyl-4-methylthiothiazol-5-yl)phosphorothionate
dimethyl-(2,4-diisopropylthiazol-5-yl)phosphorothionate
dimethyl-(2-isopropyl-4-s-butyl-thiazol-5-yl)phosphorothionate
dimethyl-(2-methyl-4-s-butylthiazol-5-yl)phosphorothionate
O-methyl-O-(4-isopropyl-2-methylthiazol-5-yl)ethylphosphonothionate
dimethyl-(2-isopropoxy-4-isopropylthiazol-5-yl)phosphorothionate
diethyl-(4-isopropyl-2-phenylthiazol-5-yl)phosphorothionate
ethyl-(4-isopropyl-2-phenylthiazol-5-yl)methylphosphorothionate
O-methyl-O-(4-isopropyl-2-phenylthiazol-5-yl)ethylphosphonothionate
dimethyl-(4-methyl-2-phenylthiazol-5-yl)phosphorothionate
diethyl-(4-methyl-2-phenylthiazol-5-yl)phosphorothionate.

EXAMPLE VII

Insecticidal and acaricidal activity

The insecticidal and acaricidal activity of compounds of the invention was tested as follows:

(I) A 0.1% by weight solution in acetone of the compound to be tested was prepared, and taken up in a micrometer syringe. Two to three-day old adult female houseflies (*Musca domestica*) were anaesthetized with carbon dioxide, and a 1 microliter drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(II) A quantity of 0.1 milliliter of a 0.1% by weight solution of the compound to be tested in acetone was mixed in a beaker with 100 milliliters of water. Twenty 5-6 day old (4th instar) mosquito larvae (*Aedes aegypti*) were added and the beakers stored for 24 hours. The percentage of dead and moribund larvae was then recorded.

(III) The compounds were formulated as solutions or suspension in water containing 20% by weight of acetone and 0.05% by weight of Triton X-100 as wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 450 liters per hectare, the plants passing under the spray on a moving belt. Ten 4th instar (8 day old) diamond-back moth larvae (*Plutella maculipennis*) or ten adult 1-2 week old mustard beetles (*Phaedon cochleariae*) were placed on the sprayed leaf of each turnip plant and ten apterous (6 day old) vetch aphids (*Megoura viciae*) were placed on the sprayed leaf of each broad bean plant. The plants were then enclosed in glass cylinders fitted at one end with a muslin cap. Mortality counts were made after 24 hours.

(IV) In tests against glass house spider mites (*Tetranychus urticae*) leaf discs cut from French bean plants were sprayed in the manner described under (III). One hour after spraying, the discs were inoculated with 10 adult mites. Mortality counts were made 24 hours after inoculation.

(V) In tests against large white butterfly larvae (*Pieris brassicae*), leaf discs cut from cabbage leaves were sprayed in the manner described under (III). 10 3rd instar (8-10 day old) larvae were placed on the discs within petri-dish pairs. Mortality counts were made 24 hours after inoculation.

The results of these tests are set out in Table I in which A denotes total kill, B some kill and C no kill of the test species.

TABLE 1

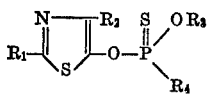

| Compound | | | | Activity | | | | | | |
|---|---|---|---|---|---|---|---|---|---|---|
| R₁ | R₂ | R₃ | R₄ | M. domestica | A. aegypti | P. cochleariae | P. maculipennis | P. brassicae | M. viciae | T. urticae |
| CH₃ | CH(CH₃)₂ | CH₃ | OCH₃ | A | A | A | A | A | A | A |
| C₆H₅ | CH(CH₃)₂ | CH₃ | OCH₃ | A | A | A | A | A | B | A |
| C₆H₅ | CH₂CH₂SCH₃ | CH₃ | OCH₃ | C | A | A | C | ---- | C | B |
| C₆H₅ | C₆H₅ | CH₃ | OCH₃ | C | A | C | C | ---- | C | B |
| CH₃ | SCH₃ | CH₃ | OCH₃ | A | A | B | A | A | A | A |
| (CH₃)₂CH | CH(CH₃)₂ | CH₃ | OCH₃ | A | A | A | A | A | A | A |
| (CH₃)₂CH | CH(CH₃)C₂H₅ | CH₃ | OCH₃ | A | A | A | A | A | A | A |
| CH₃ | CH(CH₃)C₂H₅ | CH₃ | OCH₃ | A | A | A | A | ---- | A | A |
| CH₃ | CH(CH₃)₂ | CH₃ | C₂H₅ | A | B | A | A | A | A | A |
| (CH₃)₂CHO | CH(CH₃)₂ | CH₃ | OCH₃ | A | A | A | A | A | A | A |
| C₆H₅ | CH(CH₃)₂ | C₂H₅ | OC₂H₅ | A | A | B | B | A | A | A |
| C₆H₅ | CH(CH₃)₂ | CH₃ | OC₂H₅ | A | A | A | A | A | B | A |
| C₆H₅ | CH(CH₃)₂ | CH₃ | C₂H₅ | A | A | A | A | A | A | A |
| C₆H₅ | CH₃ | CH₃ | OCH₃ | A | A | A | A | A | A | A |
| C₆H₅ | CH₃ | C₂H₅ | OC₂H₅ | A | A | A | A | A | A | A |

I claim as my invention:

1. A thiazole derivative of the general formula:

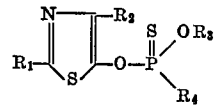

wherein $R_1$ is alkyl or alkoxy of 1-6 carbon atoms, or phenyl; $R_2$ is alkyl, alkylthio or alkylthioalkyl of up to 6 carbon atoms, or phenyl; $R_3$ is alkyl of 1-6 carbon atoms; and $R_4$ is alkyl, alkoxy, or dialkylamino of up to 6 carbon atoms.

2. A thiazole derivative as claimed in claim 1 wherein $R_1$ represents an alkyl group of 1-6 carbon atoms or a phenyl group; and $R_4$ represents an alkoxy group of 1-6 carbon atoms.

3. A thiazole derivative as claimed in claim 2 wherein $R_1$ is methyl, isopropyl, isopropoxy or phenyl; $R_2$ is methyl, isopropyl, s-butyl, methylthio, methylthioethyl or phenyl; $R_3$ is methyl or ethyl; and $R_4$ is ethyl, methoxy, ethoxy or dimethylamino.

References Cited
UNITED STATES PATENTS
3,159,645   12/1964   Rigterink _____ 260—302 G RICHARD J. GALLAGHER, Primary Examiner U.S. Cl. X.R.
260—306.7; 424—200